United States Patent
Honjo et al.

(10) Patent No.: US 9,020,524 B2
(45) Date of Patent: Apr. 28, 2015

(54) INFORMATION PROCESSING APPARATUS, INFORMATION MANAGEMENT SERVER, INFORMATION PROCESSING METHOD, INFORMATION MANAGEMENT METHOD, PROGRAM, AND INFORMATION PROCESSING SYSTEM

(75) Inventors: Ryoki Honjo, Kanagawa (JP); Hideki Noma, Kanagawa (JP)

(73) Assignee: Sony Corporation, Tokyo (JP)

(*) Notice: Subject to any disclaimer, the term of this patent is extended or adjusted under 35 U.S.C. 154(b) by 212 days.

(21) Appl. No.: 13/296,674

(22) Filed: Nov. 15, 2011

(65) Prior Publication Data

US 2012/0149391 A1    Jun. 14, 2012

(30) Foreign Application Priority Data

Dec. 14, 2010   (JP) ................. P2010-277984

(51) Int. Cl.
  *H04W 24/00* (2009.01)
  *H04W 48/16* (2009.01)
  *H04W 64/00* (2009.01)

(52) U.S. Cl.
  CPC .............. *H04W 48/16* (2013.01); *H04W 64/00* (2013.01)

(58) Field of Classification Search
  USPC .................... 455/456.1, 456.6; 709/201, 204
  See application file for complete search history.

(56) References Cited

U.S. PATENT DOCUMENTS

2010/0082726 A1*   4/2010   Kim et al. .................... 709/201

FOREIGN PATENT DOCUMENTS

JP   2008-028792   7/2008

\* cited by examiner

*Primary Examiner* — Phuoc H Doan
(74) *Attorney, Agent, or Firm* — Sony Corporation

(57) ABSTRACT

An information processing apparatus includes a position detection unit that detects a presence position of the information processing apparatus, a communication network information obtaining unit that obtains information regarding data communication in an accessible mobile communication network, and a data communication related information generation unit that generates data communication related information regarding the data communication using the mobile communication network at the presence position based on information regarding the presence position and information regarding the data communication in the mobile communication network.

14 Claims, 13 Drawing Sheets

FIG. 7

<MOBILE COMMUNICATION NETWORK DB>

| OPERATOR INFORMATION | | | SERVICE PROVIDING AREA | CONTRACT OPERATOR INFORMATION | COMMUNICATION SCHEME | PACKET SERVICE | THROUGHPUT | POSITIONAL INFORMATION | ... |
|---|---|---|---|---|---|---|---|---|---|
| OPERATOR NAME | MCC | MNC | | | | | | | |
| XXX | 440 | XX | JAPAN | XXX | XX | PROVIDE | XX | XX | ... |
| ... | ... | ... | ... | ... | ... | ... | ... | ... | ... |

FIG. 8

<ACCESS POINT DB>

| OPERATOR INFORMATION | ACCESS POINT NAME | ACCESS POINT RELATED INFORMATION |
|---|---|---|
| XXX | XXXX | ... |
| ... | ... | ... |
| ... | ... | ... |

FIG. 9

<COOPERATING OPERATOR DB>

| OPERATOR INFORMATION | POSITIONAL INFORMATION | COOPERATING OPERATOR INFORMATION | PACKET SERVICE | |
|---|---|---|---|---|
| XXX | XXXX | XXXX | PROVIDE | ... |
| | XXXX | XXXX | PROVIDE | ... |
| ... | ... | ... | ... | ... |
| ... | ... | ... | ... | ... |
| | | | | ... |

INFORMATION PROCESSING APPARATUS, INFORMATION MANAGEMENT SERVER, INFORMATION PROCESSING METHOD, INFORMATION MANAGEMENT METHOD, PROGRAM, AND INFORMATION PROCESSING SYSTEM

CROSS REFERENCES TO RELATED APPLICATIONS

The present application claims priority to Japanese Priority Patent Application JP 2010-277984 filed in the Japan Patent Office on Dec. 14, 2010, the entire content of which is hereby incorporated by reference.

BACKGROUND

The present application relates to an information processing apparatus, an information management server, an information processing method, an information management method, a program, and an information processing system.

In recent years, with the advance of information processing techniques or the like, the functions of mobile phone terminals have been dramatically improved (for example, refer to Japanese Unexamined Patent Application Publication No. 2008-28792), and thus a mobile phone terminal under contract in Japan can be used in many countries through roaming.

Here, under the circumstances where a plurality of operators respectively provide mobile communication networks, such as urban area, typically, a mobile phone communication module sequentially searches for the operators, and transmits SIM contract information (IMSI and the like) to the mobile communication networks. Further, the mobile phone communication module selects mobile communication networks which are accessible by the mobile communication networks as mobile communication networks available to the mobile phone communication module. In addition to this case, there is a case where a user or embedded software manually sets identification information (network code) of available mobile communication networks in advance.

SUMMARY

However, calling or the like is possible through the use of the above-described automatic selection; however, there is a problem in that a packet service may not be received, or the best network is not necessarily selected in terms of the communication rate or the like.

In addition, in recent years, not only phone terminals for human use, but also machine devices called an M2M (Machine to Machine) devices have a WAN function, and thus the performance of mutual communication between the devices has increased. When considering usage where the M2M devices are globally disposed and are moved, it may be important to select optimal networks according to the location where the devices are installed. In order to select the networks, information regarding optimal networks correlated with global positions is necessary, but a technique for obtaining such information has not yet been proposed.

It is desirable to provide an information processing apparatus, an information management server, an information processing method, an information management method, a program, and an information processing system, capable of generating information regarding a mobile communication network which can use data communication at a position where a device is present.

According to an embodiment, there is provided an information processing apparatus including a position detection unit that detects a presence position of the information processing apparatus; a communication network information obtaining unit that obtains information regarding data communication in an accessible mobile communication network; and a data communication related information generation unit that generates data communication related information regarding the data communication using the mobile communication network at the presence position based on information regarding the presence position and information regarding the data communication in the mobile communication network.

The data communication related information generation unit may transmit the generated data communication related information to an external information management server via the accessible mobile communication network.

The information processing apparatus may further include a mobile communication control unit that controls data communication performed via a mobile communication network, and the mobile communication control unit may select the mobile communication network which is available at the current position based on at least one of the data communication related information generated by the data communication related information generation unit and the data communication related information obtained from the information management server.

The information regarding the data communication in the mobile communication network may include at least one of information regarding an operator which provides a mobile communication network, information regarding a communication scheme in a mobile communication network, information regarding whether or not to provide a packet service in a mobile communication network, and information regarding an access point of a mobile communication network.

The communication network information obtaining unit may establish connection to an arbitrary external server via the mobile communication network, and may further measure at least one of throughput, packet loss, bit rate, blocked ports, response time, and response delay between the information processing apparatus and the arbitrary external server.

According to another embodiment, there is provided an information management server including a data communication related information obtaining unit that obtains data communication related information regarding data communication using a mobile communication network at a presence position, generated based on information indicating the presence position of an information processing apparatus and information regarding data communication in a mobile communication network which is accessible at the presence position; and an information management unit that manages a database which correlates the presence position of an information processing apparatus with information regarding an available mobile communication network based on the obtained data communication related information.

The information management unit may further correlate information regarding a second operator with which an operator providing the mobile communication network described in the obtained data communication related information cooperates with regard to roaming, with the database.

The information management server may further include a management information providing unit that provides the managed database to an information processing apparatus which requests the database.

According to still another embodiment, there is provided an information processing method including detecting a presence position of an information processing apparatus; obtaining information regarding data communication in an accessible mobile communication network; and generating data communication related information regarding the data communication using the mobile communication network at the presence position based on information regarding the presence position and information regarding the data communication in the mobile communication network.

According to still another embodiment, there is provided an information management method including obtaining data communication related information regarding data communication using a mobile communication network at a presence position, generated based on information indicating the presence position of an information processing apparatus and information regarding data communication in a mobile communication network which is accessible at the presence position; and managing a database which correlates a presence position of an information processing apparatus with information regarding an available mobile communication network based on the obtained data communication related information.

According to still another embodiment, there is provided a program enabling a computer to realize the functions of detecting a presence position of a self device; obtaining information regarding data communication in an accessible mobile communication network; and generating data communication related information regarding the data communication using the mobile communication network at the presence position based on information regarding the presence position and information regarding the data communication in the mobile communication network.

According to still another embodiment, there is provided a program enabling a computer which can communicate with an external information processing apparatus to realize the functions of obtaining data communication related information regarding data communication using a mobile communication network at a presence position from an image processing apparatus, generated based on information indicating the presence position of the information processing apparatus and information regarding data communication in a mobile communication network which is accessible at the presence position; and managing a database which correlates a presence position of an information processing apparatus with information regarding an available mobile communication network based on the obtained data communication related information.

According to still another embodiment, there is provided an information processing system including the information processing apparatus and the information management server.

As described above, according to the embodiments of the present disclosure, it is possible to generate information regarding a mobile communication network which can use data communication at a position where a device is present.

Additional features and advantages are described herein, and will be apparent from the following Detailed Description and the figures.

BRIEF DESCRIPTION OF THE FIGURES

FIG. 7 is a diagram illustrating an example of the database according to the embodiment.

FIG. 8 is a diagram illustrating an example of the database according to the embodiment.

FIG. 9 is a diagram illustrating an example of the database according to the embodiment.

DETAILED DESCRIPTION

Figure 1:
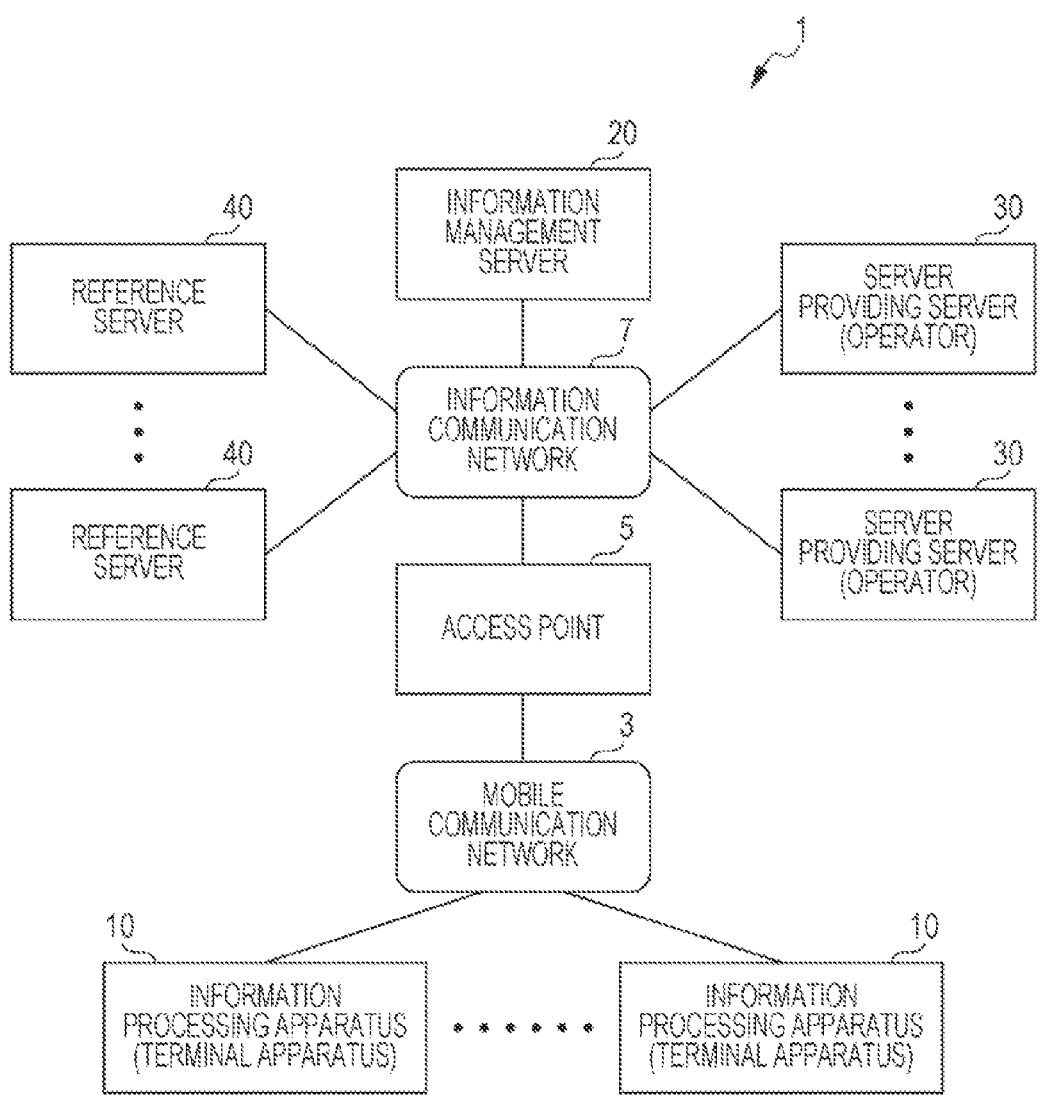
FIG. 1 is a diagram illustrating an information processing system according to a first embodiment.

The present application will be described with reference to the accompanying drawings according to an embodiment. In addition, in the present specification and the drawings, constituent elements having substantially the same functional configurations are given the same reference numerals, and repeated description thereof will be omitted.

Further, the description will be made in the following order.
1. FIRST EMBODIMENT
  1-1. INFORMATION PROCESSING SYSTEM
  1-2. CONFIGURATION OF INFORMATION PROCESSING APPARATUS
  1-3. CONFIGURATION OF INFORMATION MANAGEMENT SERVER
  1-4. EXAMPLE OF DATABASE
  1-5. INFORMATION PROCESSING METHOD
  1-6. INFORMATION MANAGEMENT METHOD
2. HARDWARE CONFIGURATIONS OF INFORMATION PROCESSING APPARATUS AND INFORMATION MANAGEMENT SERVER ACCORDING TO EMBODIMENT OF PRESENT DISCLOSURE
3. CONCLUSION First Embodiment Information Processing System First, referring to FIG. 1, a configuration of an information processing system according to the first embodiment will be described briefly. FIG. 1 is a diagram illustrating a configuration of the information processing system according to the embodiment.

As shown in FIG. 1, the information processing system 1 according to the embodiment includes one or a plurality of information processing apparatuses 10 and an information management server 20 which can communicate with each other via a mobile communication network 3, an access point 5, and an information communication network 7. In addition, the information communication network 7 may be connected to one or a plurality of service providing servers 30 belonging to an operator which provides the mobile communication network 3 service, or one or a plurality of reference servers 40 which can be referred to by the information processing apparatus 10.

The mobile communication network 3 is a digital mobile phone communication network which connects the information processing apparatus 10 according to the embodiment to the information communication network 7 so as to communicate with each other through mobile communication. The calling scheme of the digital mobile phone communication network is not particularly limited, but is preferably set according to communication circumstances of the region where the information processing system 1 according to the embodiment is installed.

For example, in a case where the information processing system 1 according to the embodiment is spread globally, it is preferable to use digital mobile phone communication networks available in the countries or regions of the world. As one of the digital mobile phone communication networks, there is GSM (Global System for Mobile communications).

In addition, in a case where the information processing system 1 according to the embodiment is installed countries or regions where a so-called third generation mobile phone calling scheme having a high communication rate and good frequency band use efficiency is available, this calling scheme may be used.

The access point 5 relays communication which is performed by the information processing apparatus 10 via the mobile communication network 3, to the information communication network 7. An example of the access point 5 includes a server belonging to a telecommunications carrier which provides the mobile communication network 3. The access point 5 may be appropriately provided in the information processing system 1 according to the embodiment as necessary.

The information communication network 7 is a communication network to which the information management server 20 according to the embodiment is connected. Various devices or servers and the mobile communication network 3 connected to the information communication network 7 can communicate with each other in a bidirectional manner via the information communication network 7. The information communication network 7 includes, for example, a public network such as the Internet, a telephone network, a satellite communication network, and a broadcast network, or a dedicated network such as a WAN (Wide Area Network), a LAN (Local Area Network), an IP-VPN (Internet Protocol-Virtual Private Network), Ethernet (registered trademark), and a wireless LAN, regardless of whether wired or wireless.

The information processing apparatus 10 is a terminal apparatus of the information processing system 1 according to the embodiment. The information processing apparatus 10 is provided with, for example, a module in which an identifier IMSI (International Mobile Subscriber Identity) allocated to a user in a fixed manner is written, and thus can perform communication using the mobile communication network 3. In addition, the information processing apparatus 10 according to the embodiment obtains data such as GGA or RMC output from a GPS (Global Positioning System) and can detect an installation position where the self device (information processing apparatus 10) is installed. In addition, the information processing apparatus 10 may detect the current position using, for example, a base station of the mobile communication network 3, an access point or a wireless base station used through RFID (Radio Frequency Identification) or Wi-Fi, or the like.

The information processing apparatus 10 searches for accessible mobile communication networks at a position where the information processing apparatus 10 is present, and obtains a variety of characteristic information on the mobile communication network, such as information regarding the operator providing services and information regarding the communication scheme, for each of the accessible mobile communication networks. The information processing apparatus 10 automatically selects the mobile communication network 3 which is appropriate to be accessed at the current position by the use of the obtained information when the information processing apparatus 10 performs communication via the mobile communication network 3.

In addition, the information processing apparatus 10 may provide the obtained information regarding the mobile communication network to the information management server 20 after being correlated with information regarding the position where the information processing apparatus 10 is present.

The information processing apparatus 10 may include, for example, a personal computer, a television set, various recorders such as a DVD recorder or a Blu-Ray recorder, a car navigation system, and an information appliance. In addition, the information processing apparatus 10 may include various communication devices such as a mobile phone, PDA, or a so-called smart phone, a portable content reproduction device such as a portable music player, an information portable terminal having a touch panel, or the like. Further, the information processing apparatus 10 may include a battery device which can access a so-called smart grid and has a battery, various kinds of smart meters, or the like. The information processing apparatus 10 according to the embodiment may include a variety of devices which do not have a so-called user interface.

In addition, the information processing apparatus 10 according to the embodiment will be described later in detail.

The information management server 20 obtains information regarding a mobile communication network correlated with current position information output from the information processing apparatus 10 of the information processing system 1, and manages the obtained information. Thereby, the information management server 20 can manage information regarding the mobile communication network 3 at each location of the information processing system 1 where the information processing apparatus 10 is present, for example, in a form of a database. In addition, the information management server 20 can appropriately provide a variety of information to the information processing apparatus 10. The information processing apparatus 10 can easily select the mobile communication network 3 which is most suitable for the location at each location of the information processing system 1 by the use of the information provided from the information management server 20.

Further, the information management server 20 according to the embodiment will be also described later in detail.

The service providing server 30 is a server connected to the information communication network 7, and is a server managed by an operator which provides the mobile communication network 3 service. The information management server 20 can obtain a variety of information such as information regarding another operator with which the mobile communication network 3 provided by a corresponding operator cooperates, by referring to the service providing server 30.

The reference servers 40 are a variety of servers connected to the information communication network 7. Various kinds of devices which can access the information communication network 7 can access the reference server 40 or view information managed by the reference server 40.

In addition, the information processing system 1 may be connected to an information terminal operated by a user which can use the information processing system 1, as a user operation terminal. The user can appropriately refer to operation circumstances of the information processing apparatus 10 or the database and the like managed by the information management server 20, by operating the user operation terminal. Such an information terminal may include, for example, a personal computer, a television set, various recorders such as a DVD recorder or a Blu-Ray recorder, a car navigation system, and an information appliance. In addition, the user operation terminal may include various communication devices such as a mobile phone, PDA, or a so-called smart phone, a portable content reproduction device such as a portable music player, an information portable terminal having a touch panel, or the like.

As above, the configuration of the information processing system 1 according to the embodiment has been described briefly.

Configuration of Information Processing Apparatus

Figure 2:
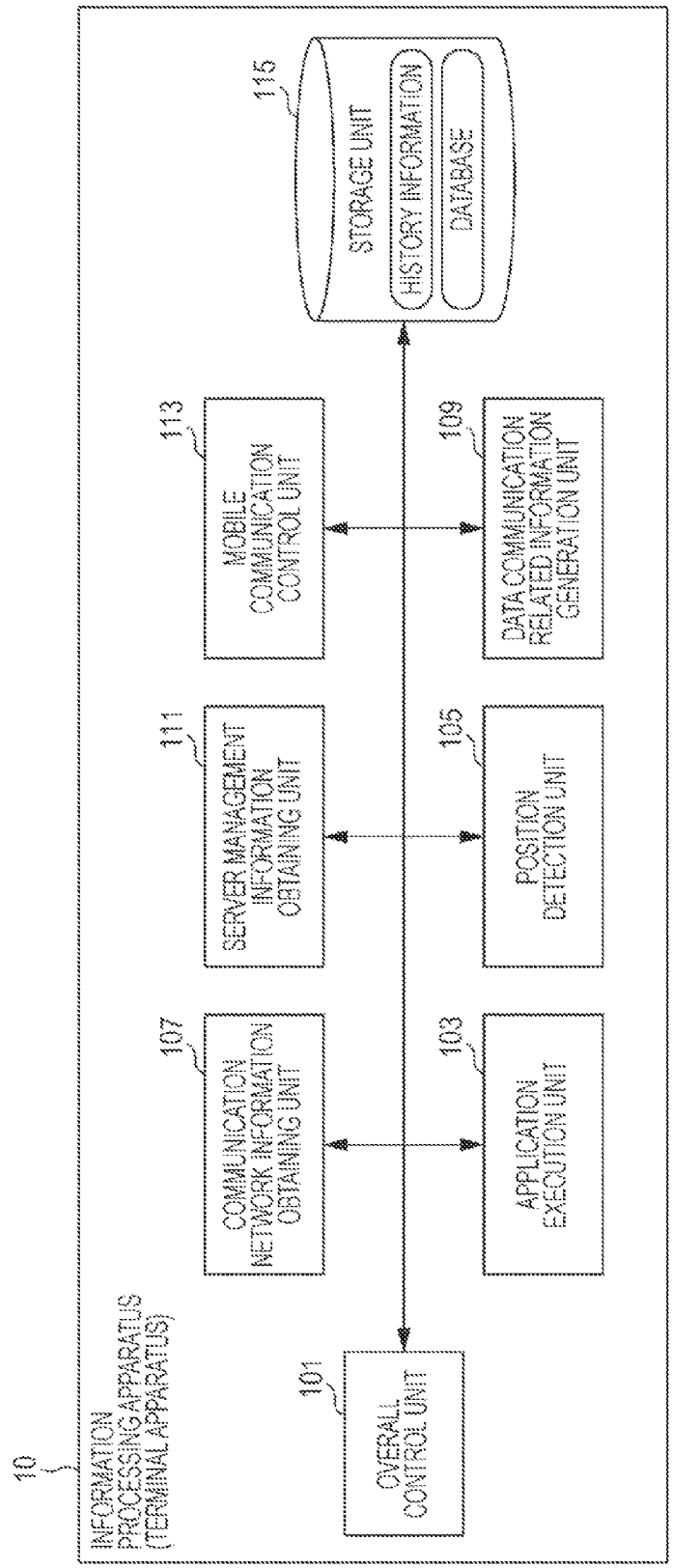
FIG. 2 is a block diagram illustrating a configuration of an information processing apparatus according to the embodiment.

Next, a configuration of the information processing apparatus 10 according to the embodiment will be described in detail with reference to FIG. 2. FIG. 2 is a block diagram illustrating a configuration of the information processing apparatus 10 according to the embodiment As shown in FIG. 2, the information processing apparatus 10 according to the embodiment mainly includes, for example, an overall control unit 101, an application execution unit 103, a position detection unit 105, a communication network information obtaining unit 107, a data communication related information generation unit 109, a server management information obtaining unit 111, a mobile communication control unit 113, and a storage unit 115.

The overall control unit 101 is implemented by, for example, a CPU (Central Processing Unit), a ROM (Read Only Memory), a RAM (Random Access Memory), and the like. The overall control unit 101 is a processing unit which collectively controls operations of the information processing apparatus 10 according to the embodiment. The information processing apparatus 10 realizes various kinds of fundamental functions provided by a user by the overall control unit 101. For example, in a case where the information processing apparatus 10 is a television set, functions of obtaining and reproducing moving image content items are realized by the overall control unit 101. In addition, in a case where the information processing apparatus 10 is a battery device, a function of supplying power to a battery or obtaining power from the battery is realized.

In addition, the imaging unit 101 can perform various kinds of processes in cooperation with the other processing units included in the information processing apparatus 10.

The application execution unit 103 is implemented by, for example, a CPU, a ROM, a RAM, and the like. The application execution unit 103 can realize various kinds of functions in the information processing apparatus 10 by executing various programs held in or obtained by the information processing apparatus 10. In addition, the application execution unit 103 can realize various functions which are provided to the servers, in the information processing apparatus 10 along with the various servers installed outside the information processing apparatus 10.

The position detection unit 105 is implemented by, for example, a CPU, a ROM, a RAM, a communication device, and the like. The position detection unit 105 detects the current position of the information processing apparatus 10 by the use of a base station used through mobile communication such as GPS or mobile phone, an access point or a wireless base station used through RFID or Wi-Fi.

When detecting the current position of the information processing apparatus 10, the position detection unit 105 outputs information indicating the detected current position (hereinafter, also referred to as current position information) to the data communication related information generation unit 109 described later. Here, an example of the current position information may include information regarding latitude and longitude of the current position. In addition, the current position information is not limited to the latitude and longitude of the current position, but may be arbitrary information as long as it can uniquely specify the current position.

The position detection unit 105 can detect the current position of the information processing apparatus 10 at an arbitrary timing. For example, the position detection unit 105 may normally detect the current position of the information processing apparatus 10 or may detect the current position for each predetermined cycle.

In addition, the position detection unit 105 can output current position information regarding the detected current position at an arbitrary timing. For example, each time the current position is detected and current position information is generated, the position detection unit 105 may output the generated current position information. In addition, when the current position is varied, the position detection unit 105 may output current position information regarding the varied current position.

Further, the current position information is information which can be varied even if the position of the information processing apparatus 10 is slightly varied. For this reason, there is a possibility that the current position information itself may be varied even in a case where a variation in the current position of the information processing apparatus 10 is slight, and thus the information processing apparatus 10 can be regarded as being present at substantially the same location. Therefore, if current position information is output according to a variation in the current position, a threshold value region for determining whether or not the information processing apparatus 10 is moved is set in advance, and the position detection unit 105 may determine that the current position is varied when the information processing apparatus 10 is moved exceeding the threshold value region.

The communication network information obtaining unit 107 is implemented by, for example, a CPU, a ROM, a RAM, a communication device, and the like. The communication network information obtaining unit 107 searches for the mobile communication networks 3 which the information processing apparatus 10 can access at the current position via the mobile communication control unit 113 described later, using a predetermined communication command or the like. Thereafter, the communication network information obtaining unit 107 obtains information regarding data communication (hereinafter, also referred to as communication network information) in the accessible mobile communication networks using a predetermined communication command or the like, for each of the detected mobile communication networks 3.

Figure 3:
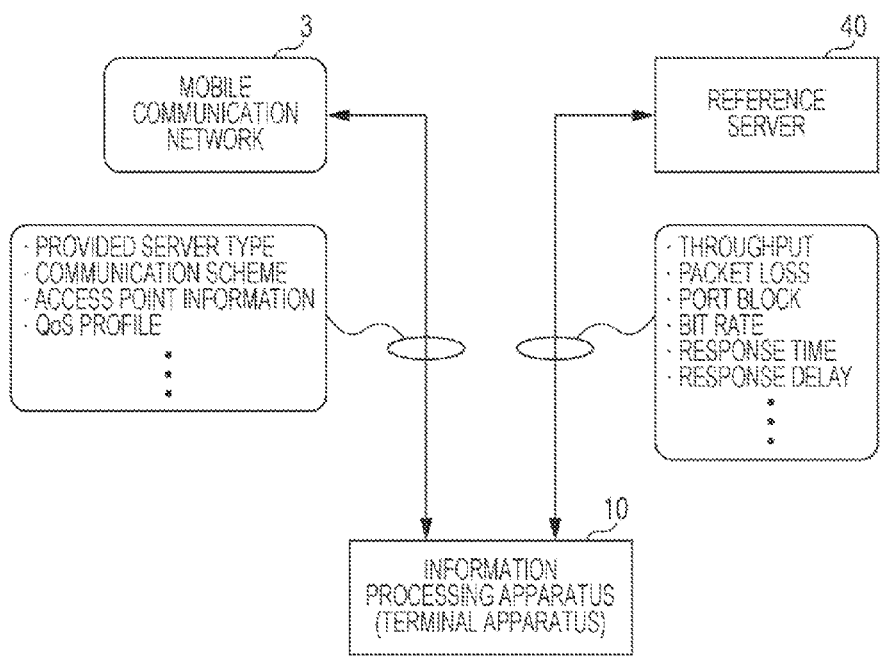
FIG. 3 is a diagram illustrating the information processing apparatus according to the embodiment.

Examples of the communication network information obtained by the communication network information obtaining unit 107 may include, as shown in FIG. 3, a service type provided by the mobile communication network 3, a communication scheme of the mobile communication network 3, information regarding an access point of the mobile communication network 3, a QoS profile of the mobile communication network 3, and the like. Here, the service type includes information indicating whether the mobile communication network 3 provides a line access service such as voice or a short message (SMS), a packet service, or the line access service and the packet service. In addition, the communication scheme of the mobile communication network 3 includes information regarding generation of the communication scheme (the second generation, the third generation, and the like), an access technology (GSM, WCDMA, HSDPA, etc.), or the like.

The communication network information obtaining unit 107 is connected to the information communication network 7 (for example, the Internet) via the detected mobile communication network 3, using a predetermined protocol (for example, pppd or the like). In addition, the communication network information obtaining unit 107 measures various kinds of information regarding a communication state of the mobile communication network 3 using a predetermined command (for example, ping or the like) with respect to an arbitrary reference server 40 connected to the information communication network 7. Various kinds of measurements regarding the connection to the information communication network 7 and the communication state are performed for each of the detected mobile communication networks 3.

Examples of the communication state obtained by the communication network information obtaining unit 107 may include, for example, as shown in FIG. 3, throughput, packet loss, presence or absence of blocked ports, bit rate, response time, response delay, whether or not various protocols (http, ssh, ssh+rsync, and the like) are accessible, and the like.

The communication network information obtaining unit 107 can obtain the communication network information and the information regarding the communication state, and preferably obtains, for example, in a case where the current position of the information processing apparatus 10 is varied, or the like.

When obtaining the communication network information and the information regarding the communication state, the communication network information obtaining unit 107 outputs the obtained information to the data communication related information generation unit 109 described later. In addition, the communication network information obtaining unit 107 may correlate information regarding the obtained date with the obtained information, and may store the correlated information in the storage unit 115 described later as history information.

The data communication related information generation unit 109 is implemented by, for example, a CPU, a ROM, a RAM, and the like. The data communication related information generation unit 109 generates data communication related information for each of the detected mobile communication networks 3 based on the current position information as a result of the position detection of the position detection unit 105, and the communication network information and the communication state obtained by the communication network information obtaining unit 107. The data communication related information is information written about data communication using a mobile communication network at a position where the information processing apparatus 10 is present.

Figure 4:
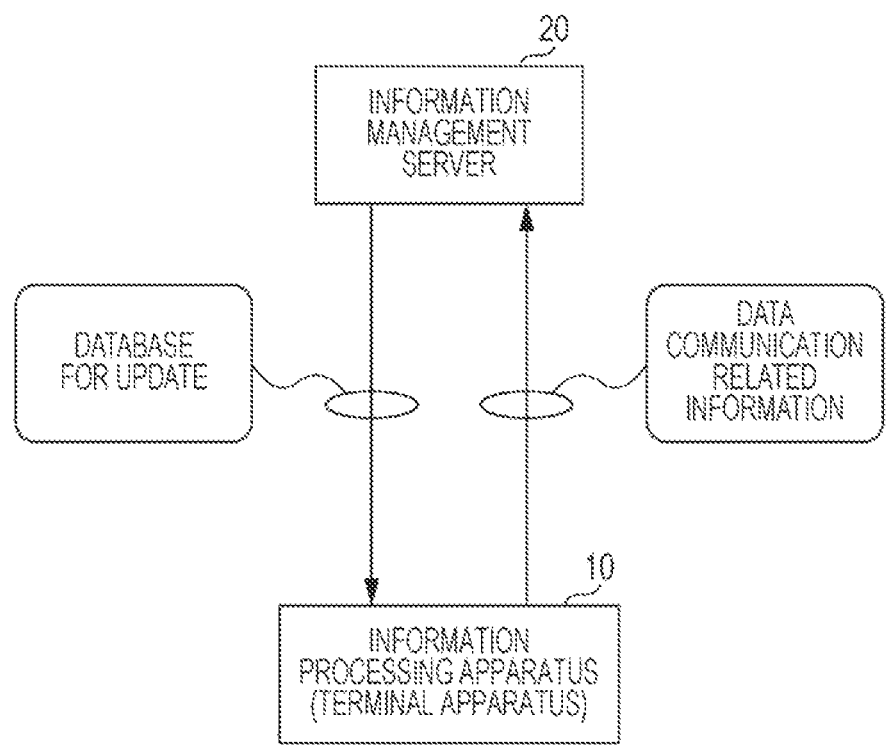
FIG. 4 is a diagram illustrating the information processing apparatus according to the embodiment.

The data communication related information generation unit 109 transmits the generated data communication related information to the information management server 20 via the mobile communication control unit 113 described later, for example, as shown in FIG. 4. The data communication related information may be transmitted when a connection state (for example, a radio wave state) of the connected mobile communication network 3 is favorable, or may be transmitted to the information management server 20 with a means separate from the data communication via the mobile communication network 3.

In addition, the data communication related information generation unit 109 preferably stores the generated data communication related information in the storage unit 115 described later.

The server management information obtaining unit 111 is implemented by, for example, a CPU, a ROM, a RAM, and the like. The server management information obtaining unit 111 obtains, from the information management server 20, various databases regarding the mobile communication network which the information management server 20 generates based on the data communication related information obtained from each of the information processing apparatuses 10. The server management information obtaining unit 111 stores the various databases obtained from the information management server 20 in the storage unit 115 described later, or the like.

In addition, the server management information obtaining unit 111 obtains data (for example, a database itself for update, difference data, or the like) for updating the databases stored in the storage unit 115 or the like, from the information management server 20, for example, as shown in FIG. 4. The data for update may be obtained at an arbitrary timing.

In addition, when the data is obtained, the server management information obtaining unit 111 may designate the current position of the information processing apparatus 10 detected by the position detection unit 105 and obtain only data corresponding to an associated region. Further, the server management information obtaining unit 111 may obtain data for all regions held in the information management server 20 regardless of the current position of the information processing apparatus 10.

The mobile communication control unit 113 is implemented by, for example, a CPU, a ROM, a RAM, a communication device, and the like. The mobile communication control unit 113 controls data communication performed via the mobile communication network 3. In addition, the mobile communication control unit 113 can control data communication performed via a plurality of mobile communication networks 3 such as, for example, an international roaming process. Thereby, the information processing apparatus 10 according to the embodiment can perform transmission and reception of data via one or a plurality of mobile communication networks 3.

There are cases where the information processing apparatus 10 establishes connection between a plurality of mobile communication networks 3 depending on a position where the information processing apparatus 10 is present. In this case, the mobile communication control unit 113 selects an available mobile communication network 3 at the current position based on either the data communication related information generated by the data communication related information generation unit 109 or the database obtained from the information management server 20. At this time, the mobile communication control unit 113 may select the mobile communication network 3 depending on a selection condition of the mobile communication network 3 (for example, emphasis is placed on the bit rate, or emphasis is placed on access charges). Thereby, the information processing apparatus 10 according to the embodiment automatically can select a mobile communication network 3 satisfying the selection condition, and can establish connection to the selected mobile communication network 3.

The storage unit 115 is an example of a storage device included in the information processing apparatus 10 according to the embodiment. The storage unit 115 stores history information generated by each processing unit included in the information processing apparatus 10, a variety of information obtained by each processing unit, a variety of information generated by each processing unit, and the like. Further, the storage unit 115 may store various databases which the information processing apparatus 10 obtains from the information management server 20. In addition, the storage unit 115 appropriately records various parameters, a mid-flow progress of the process, and the like, which are necessary to preserve when the information processing apparatus 10 according to the embodiment performs a certain process, or various databases, programs, and the like.

As above, an example of the configuration of the information processing apparatus 10 according to the embodiment has been described.

In addition, the information processing apparatus 10 according to the embodiment may be provided with various processing units or devices according to functions which the information processing apparatus 10 provides to a user, in addition to the above-described processing units.

As above, an example of the functions of the information processing apparatus 10 according to the embodiment has been described. Each of the above-described constituent elements may be configured using a general purpose member or circuit, or may be configured using hardware specialized to a function of each of the constituent elements. A CPU or the like may perform all the functions of the respective constituent elements. Therefore, a configuration to be used may be appropriately modified according to the technical level at the time of implementing the embodiment.

In addition, a computer program for realizing each function of the information processing apparatus according to the embodiment as described above is created, and may be mounted in a personal computer or the like. In addition, a recording medium which stores the computer program and is readable with a computer may be provided. The recording medium is, for example, a magnetic disk, an optical disc, a magneto-optical disc, a flash memory, or the like. In addition, the computer program may be delivered via, for example, a network without using the recording medium.

Configuration of Information Management Server

Figure 5:
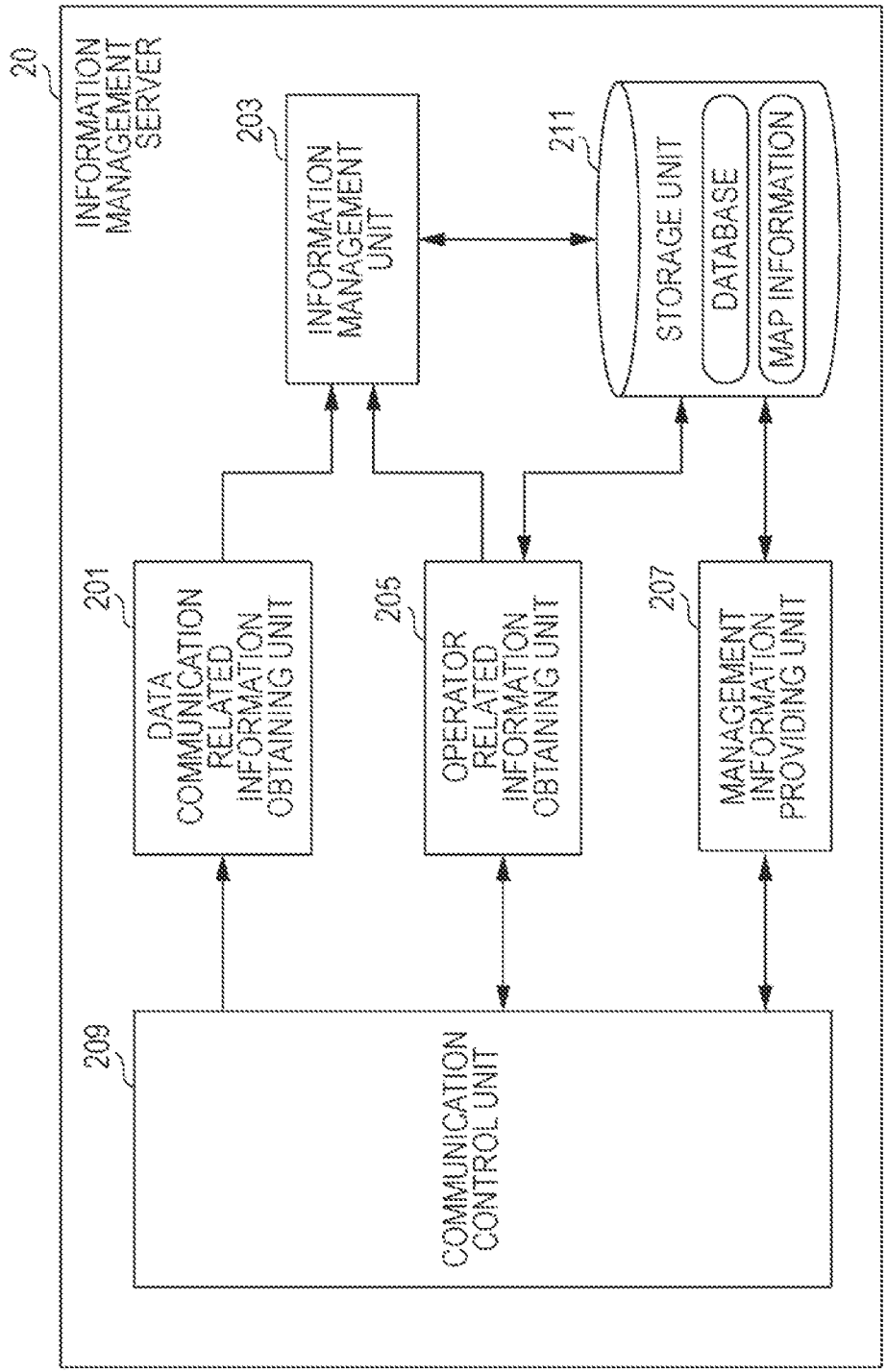
FIG. 5 is a block diagram illustrating a configuration of an information management server according to the embodiment.

Next, a configuration of the information management server 20 according to the embodiment will be described in detail with reference to FIG. 5. FIG. 5 is a block diagram illustrating a configuration of the information management server 20 according to the embodiment.

The information management server 20 according to the embodiment mainly includes, as shown in FIG. 5, a data communication related information obtaining unit 201, an information management unit 203, an operator related information obtaining unit 205, a management information providing unit 207, a communication control unit 209, and a storage unit 211.

The data communication related information obtaining unit 201 is implemented by, for example, a CPU, a ROM, a RAM, and the like. The data communication related information obtaining unit 201 obtains data communication related information generated and output by the information processing apparatus 10 according to the embodiment, from each of the information processing apparatuses 10. Thereby, the information management server 20 according to the embodiment can obtain data communication related information at a position where the information processing apparatus 10 is present, from each of the information processing apparatuses 10 included in the information processing system 1.

Here, the data communication related information obtaining unit 201 may wait for data communication related information to be received, or may request the information processing apparatuses 10 included in the information processing system 1 to periodically transmit data communication related information.

The data communication related information obtaining unit 201 outputs the obtained data communication related information to the information management unit 203 described later.

The information management unit 203 is implemented by, for example, a CPU, a ROM, a RAM, and the like. In a case where there is no database regarding the mobile communication network in the storage unit 211 described later or the like, the information management unit 203 generates a database regarding the mobile communication network based on the data communication related information output from the data communication related information obtaining unit 201. In addition, the information management unit 203 updates contents of the database which has already been generated and stored in the storage unit 211 based on the data communication related information output from the data communication related information obtaining unit 201.

In addition, when operator related information regarding an operator which provides mobile communication network service is output from the operator related information obtaining unit 205 described later, the information management unit 203 adds a description to the database based on the output operator related information.

The operator related information obtaining unit 205 is implemented by, for example, a CPU, a ROM, a RAM, and the like. The operator related information obtaining unit 205 obtains a variety of information regarding a corresponding operator (operator related information) for each operator described in a corresponding database by referring to the database stored in the storage unit 211 described later or the like. The operator related information can be obtained by, for example, viewing the service providing server 30 which is connected to the information communication network 7 and is provided by the corresponding operator.

Examples of the operator related information obtained by the operator related information obtaining unit 205 may include cooperation information regarding international roaming (information regarding cooperation with which operator with respect to communication in a certain region), information regarding use charge of a mobile communication network, and the like. In addition, the operator related information obtaining unit 205 can also obtain information necessary to automatically implement a contract with an operator regarding the use of a mobile communication network via the information communication network (hereinafter, referred to as automatic contract information) or the like, as the operator related information. The automatic contract information is described in a database managed by the storage unit 211 or the like, and thereby if installed at an unknown location, the information processing apparatus 10 can automatically select a mobile communication network appropriate for the location, and can automatically send and receive a usage contract to and from an operator which manages the selected mobile communication network.

The operator related information obtaining unit 205 outputs the operator related information obtained in this way to the information management unit 203.

The management information providing unit 207 is implemented by, for example, a CPU, a ROM, a RAM, and the like. The management information providing unit 207 provides the database, stored in the storage unit 211 or the like, regarding a mobile communication network, to an external device. For example, in a case where the information processing apparatus 10 included in the information processing system 1 makes a request for providing the database, the management information providing unit 207 provides the managed database to the information processing apparatus 10 which has made the request. In this case, the management information providing unit 207 may provide only a database corresponding to a region which has been designated (for example, by country, by region, and the like) of the held databases, or may provide all the held databases. This determination may be performed depending on a request from the information processing apparatus 10, or may be performed depending on determination with the information processing apparatus 10 (for example, such that costs necessary to receive the database become minimal).

In addition, in a case where a user operation terminal connected to the information communication network 7 makes a request for viewing managed databases, the management information providing unit 207 may provide contents of the databases to the user operation terminal. Since the database according to the embodiment correlates a variety of information regarding mobile communication with positional information (for example, latitude, longitude, and the like), contents of the held database may be provided while showing a map on the user operation terminal using, for example, map information or the like.

The communication control unit 209 is implemented by, for example, a CPU, a ROM, a RAM, a communication device, and the like. The communication control unit 209 controls bidirectional communication performed between the information management server 20 and the respective devices via the information communication network 7. When information is transmitted from an external device via the information communication network 7, the communication control unit 209 obtains the transmitted information and transmits the obtained information to an appropriate processing unit inside the information management server 20. In addition, in a case where there is a request for transmitting information from each processing unit inside the information management server 20 via the information communication network 7, the communication control unit 209 transmits requested information via the information communication network 7.

The storage unit 211 is an example of a storage device included in the information management server 20 according to the embodiment. The storage unit 211 stores various databases regarding the mobile communication networks generated and updated based on the obtained data communication related information. In addition, the storage unit 211 may store a variety of map information. The storage unit 211 stores history information generated by each processing unit included in the information management server 20, a variety of information obtained by each processing unit, a variety of information generated by each processing unit, and the like. In addition, the storage unit 211 appropriately records various parameters, the mid-flow progress of the process, and the like, which are necessary to preserve when the information management server 20 according to the embodiment performs a certain process, or various databases, programs, and the like.

As above, an example of the function of the information management server 20 according to the embodiment has been described. Each of the above-described constituent elements may be configured using a general purpose member or circuit, or may be configured using hardware specialized to a function of each of the constituent elements. A CPU or the like may perform all the functions of the respective constituent elements. Therefore, a configuration to be used may be appropriately modified according to the technical level at the time of implementing the embodiment.

In addition, a computer program for realizing each function of the information processing apparatus according to the embodiment as described above is created, and may be mounted in a personal computer or the like. In addition, a recording medium which stores the computer program and is readable with a computer may be provided. The recording medium is, for example, a magnetic disk, an optical disc, a magneto-optical disc, a flash memory, or the like. In addition, the computer program may be delivered via, for example, a network without using the recording medium.

Example of Database

Next, an example of the database regarding the mobile communication network 3, managed by the information management server 20 according to the embodiment will be described with reference to FIGS. 6 to 9. FIGS. 6 to 9 are diagrams illustrating an example of the database regarding the mobile communication network.

As described above, the information processing apparatus 10 according to the embodiment generates data communication related information regarding the mobile communication network 3 which is available at a position where the information processing apparatus 10 is present, and transmits the generated data communication related information to the information management server 20 via the mobile communication network 3 and the information communication network 7. The information management server 20 generates a database indicating which mobile communication network is available at a certain position, based on the data communication related information transmitted from each of the information processing apparatuses 10. The generated database may be databases which describe only so-called recommended mobile communication networks; however, the database may describe a variety of information regardless of the communication states as long as mobile communication networks are accessible, in order to expand the range selected by the information processing apparatus 10.

Figure 6:
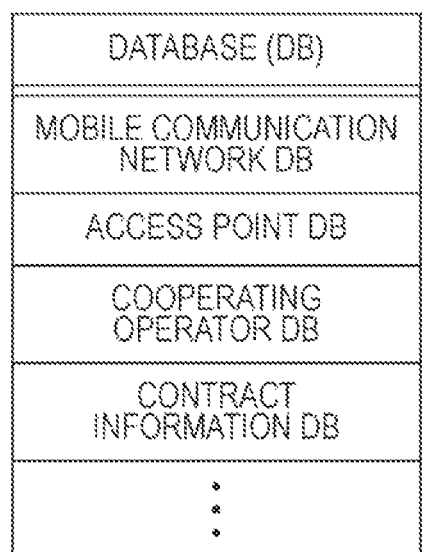
FIG. 6 is a diagram illustrating an example of the database according to the embodiment.

The database generated and updated by the information management server 20, regarding the mobile communication network 3, includes, for example, as shown in FIG. 6, a mobile communication network database (DB) which describes features of a mobile communication network, an access point DB regarding an access point, and a cooperating operator DB which describes cooperation with operators. In addition, the database may further include a contract information DB which describes automatic contract information or the like.

The mobile communication network DB includes, as exemplified in FIG. 7, operator information regarding operators, information regarding service provision areas, information regarding operators registered in SIM (contract operators), communication schemes, whether or not to provide a packet service, information regarding throughput or the like, and positional information indicating positions where the information is obtained by the information processing apparatus 10. There are cases where service contents, communication circumstances, and the like may be different depending on contract operators, even if a connected operator is the same at a position where the information processing apparatus 10 is installed. Therefore, the mobile communication network DB includes the information regarding the contract operators, and thus it is possible to appropriately handle differences in service contents due to the difference in the contract operators.

Here, the operator information describes, as shown in FIG. 7, for example, an operator name, an MNC (Mobile Network Code) which is an identification code of an operator, an MCC (Mobile Country Code) indicating a service providing region, and the like. In addition, the communication scheme describes information regarding the generation of the communication scheme, access technology, and the like. The format of the positional information is not limited, and, for example, latitude, longitude, and the like based on GPS data or the like are described.

In addition, the access point DB includes, as shown in FIG. 8, for example, operator information, information regarding the name of an access point provided by each operator, and access point related information such as the telephone number or the IP address of each access point.

In addition, the cooperating operator DB includes, as shown in FIG. 9, for example, operator information, positional information indicating a position where an operator provides a service, information regarding a cooperating operator in corresponding positional information (for example, an MCC, an MNC, and the like), and information regarding whether or not to provide a packet service.

The information management server 20 according to the embodiment builds and updates the database including the above-described contents using the data communication related information obtained from the information processing apparatus 10 or a variety of information obtained from the service providing server 30. The information processing apparatus 10 can easily select a mobile communication network appropriate for data communication, for example, even at a location where the machine is initially installed, by using the database based on the information regarding an operator which contracts with the information processing apparatus 10, the positional information or the like.

In addition, the databases shown in FIGS. 6 to 9 are only an example, and a database in the information processing system 1 according to the embodiment is not limited to the above-described databases.

Information Processing Method

Figure 10:
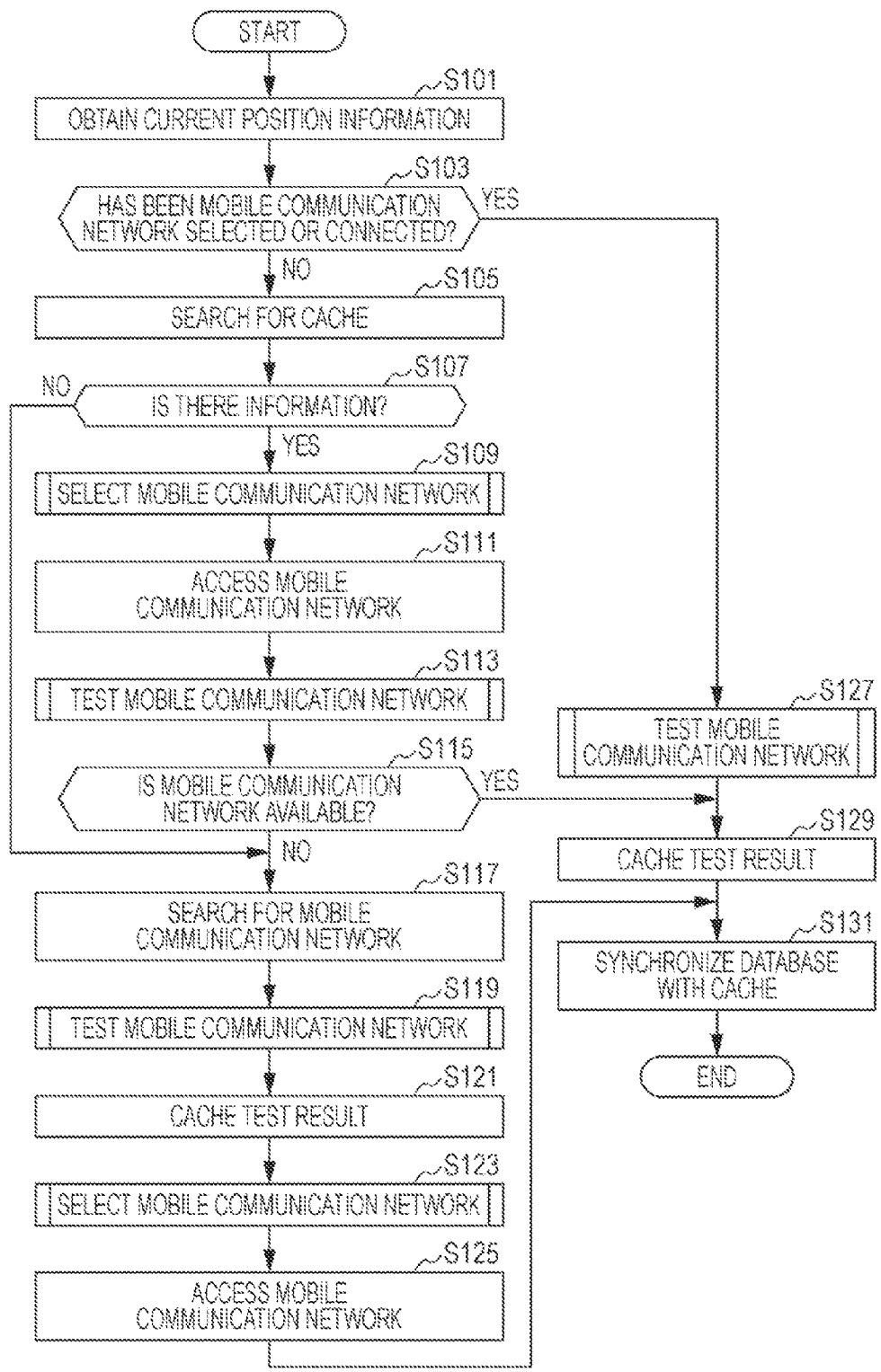
FIG. 10 is a flowchart illustrating an example of the flow of the information processing method according to the embodiment.
Figure 11:
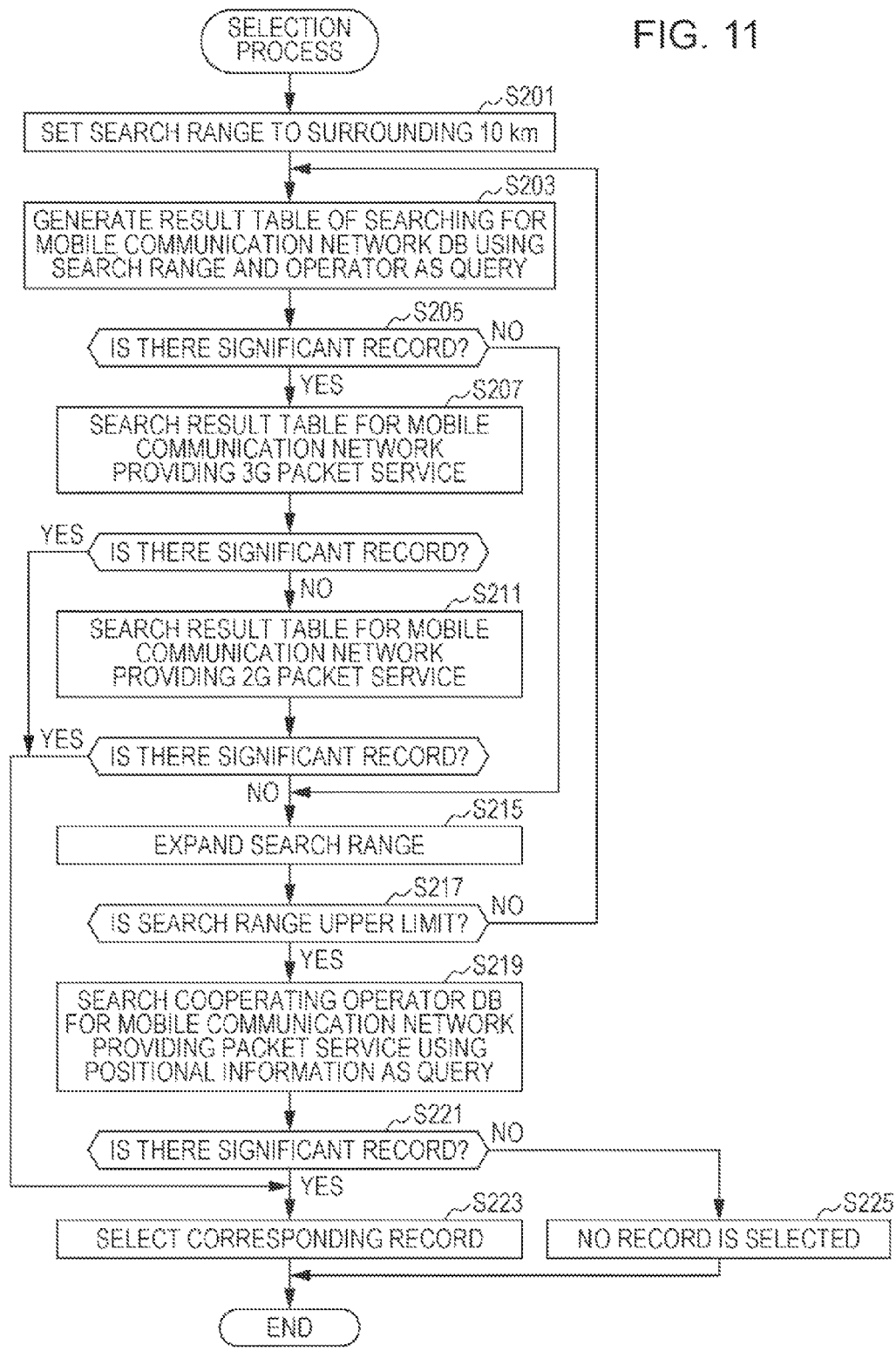
FIG. 11 is a flowchart illustrating an example of the flow of the information processing method according to the embodiment
Figure 12:
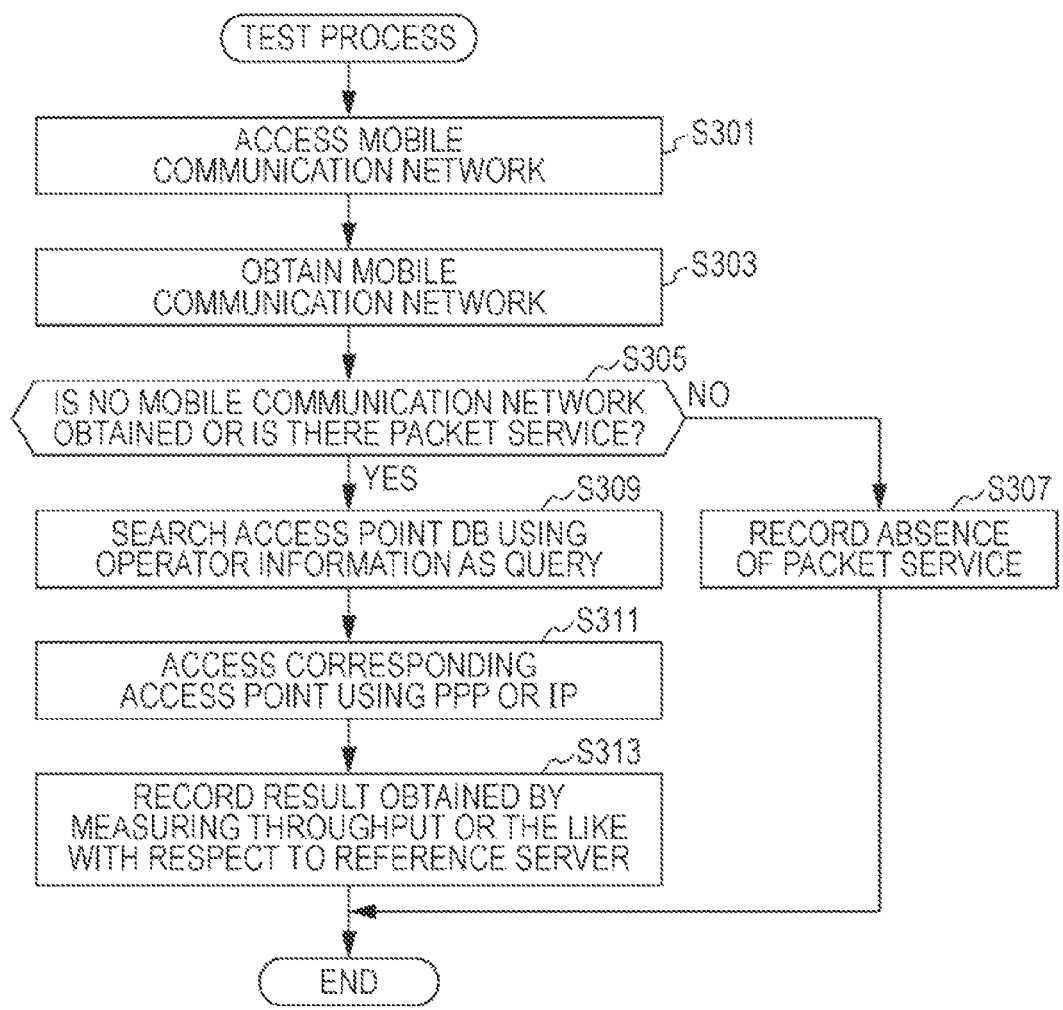
FIG. 12 is a flowchart illustrating an example of the flow of the information processing method according to the embodiment.

Next, referring to FIGS. 10 to 12, a flow of an information processing method (more specifically, an information collecting method) performed by the information processing apparatus 10 according to the embodiment will be described briefly. FIGS. 10 to 12 are flowcharts illustrating an example of the flow of the information processing method according to the embodiment.

Overall Flow

First, the position detection unit 105 of the information processing apparatus 10 obtains information indicating the current position of the information processing apparatus 10 using a GPS or the like (step S101) as current position information. In addition, the position detection unit 105 outputs the obtained current position information to the data communication related information generation unit 109.

Next, the communication network information obtaining unit 107 of the information processing apparatus 10 determines whether a mobile communication network has already been selected, or access to a mobile communication network has been completed (step S103). If the mobile communication network has already been selected, or the access has been completed, the communication network information obtaining unit 107 performs the process in step S127 described later.

On the other hand, if the mobile communication network has not been selected or the access has not been completed, the communication network information obtaining unit 107 searches for contents cached in the storage unit 115 or the like (step S105). Thereafter, the communication network information obtaining unit 107 determines whether or not information regarding the search result of mobile communication networks is present in the cache (step S107). If the information regarding the search result of mobile communication networks is present in the cache, the communication network information obtaining unit 107 performs the process in step S109 described later. On the other hand, if the information regarding the search result of mobile communication networks is not present in the cache, the communication network information obtaining unit 107 performs a process in step S117.

If the information regarding the search result of mobile communication networks is cached, the communication network information obtaining unit 107 selects a mobile communication network based on the cached information (step S109), and accesses the selected mobile communication network (step S111). In addition, the communication network information obtaining unit 107 tests the accessed mobile communication network (step S113), and determines whether or not the accessed mobile communication network is available (step S115). If it is determined that the mobile communication network is available, the communication network information obtaining unit 107 performs the process in step S129 described later. In addition, if it is determined that the mobile communication network is not available, the communication network information obtaining unit 107 performs the process in step S117 described later.

If the search result of mobile communication networks is not cached in step S107, or if it is determined that the mobile communication network is not available in step S115, the process in step S117 is performed. In this case, the communication network information obtaining unit 107 searches for mobile communication networks using a predetermined command (step S117).

Next, the communication network information obtaining unit 107 tests the mobile communication network while referring to the search result (step S119), and caches the test result (step S121). Thereafter, the communication network information obtaining unit 107 selects another mobile communication network while referring to the search result (step S123), and accesses the selected mobile communication network (step S125). Next, the communication network information obtaining unit 107 performs the process in step S131 described later.

On the other hand, if a mobile communication network has been selected or access has been completed in step S103, the communication network information obtaining unit 107 tests the mobile communication network (step S127). Next, the communication network information obtaining unit 107 caches the test result in the storage unit 115 or the like (step S129). Thereafter, the server management information obtaining unit 111 requests the information management server 20 to provide a database, and the overall control unit 101 synchronizes the database with the cache as necessary (step S131).

In addition, the communication network information obtaining unit 107 organizes a variety of information which has been obtained and cached, and outputs the information to the data communication related information generation unit 109. The data communication related information generation unit 109 generates data communication related information using current position information, and information output from the communication network information obtaining unit 107, and outputs the generated data communication related information to the information management server 20.

Selection Process of Mobile Communication Network

Next, an example of the flow of the selection process of a mobile communication network will be described in detail with reference to FIG. 11. In addition, detailed numerical values shown in the following description are only examples, and the present process is not limited to the following example.

First, the communication network information obtaining unit 107 sets a search range of mobile communication networks to surrounding 10 km from the current position (step S201). Thereafter, the communication network information obtaining unit 107 searches the mobile communication network DB using the set search range and operator as a query, and generates a result table regarding the search result (step S203).

In addition, the communication network information obtaining unit 107 refers to the result table, and determines whether or not a significant record is present in the result table (step S205). If a significant record is not present, the communication network information obtaining unit 107 performs the process in step S215 described later.

On the other hand, if a significant record is present, the communication network information obtaining unit 107 searches the result table for a mobile communication network which provides a 3G packet service (a third generation packet service) (step S207). Here, if a significant record is present in the search result, the communication network information obtaining unit 107 performs the process in step S223 described later.

In addition, if a significant record is not present interference the search result in step S207, the communication network information obtaining unit 107 searches the result table for a mobile communication network which provides a 2G packet service (a second generation packet service) (step S211). Here, if a significant record is present in the search result, the communication network information obtaining unit 107 performs the process in step S223 described later.

In addition, if a significant record is not present in the search result in step S211, the communication network information obtaining unit 107 expands the search range (step S215), and determines whether or not the search range reaches an upper limit (for example, a degree exceeding national borders) (step S217). If the search range does not reach the upper limit, the flow returns to step S203 where the communication network information obtaining unit 107 continues the process. In addition, if the search range reaches the upper limit, the communication network information obtaining unit 107 searches the cooperating operator DB for a mobile communication network which provides a packet service using positional information as a query (step S219), and determines whether or not a significant record is present (step S221).

If a significant record is present, the communication network information obtaining unit 107 selects a corresponding record (step S223), and ends the selection process of a mobile communication network. In addition, if a significant record is not present, the communication network information obtaining unit 107 selects nothing (step S225), and ends the selection process of a mobile communication network.

Test Process of Mobile Communication Network

Next, an example of the flow of the test process of a mobile communication network will be described in detail with reference to FIG. 12.

First, the communication network information obtaining unit 107 accesses a mobile communication network (step S301). In addition, if access to a mobile communication network has already been established, the accessed mobile communication network is registered. Thereafter, the communication network information obtaining unit 107 obtains communication network information using various commands such as a command for searching for a service provided by an operator (step S303).

Next, the communication network information obtaining unit 107 determines if communication network information may not be obtained, or whether or not a packet service is present (step S305). If communication network information may not be obtained and a packet service is not present, the communication network information obtaining unit 107 records that there is no packet service (step S307), and ends the test process.

On the other hand, if communication network information can be obtained, or a packet service is present, the communication network information obtaining unit 107 searches the access point DB using operator information as a query (step S309). Next, the communication network information obtaining unit 107 accesses a corresponding access point through the Internet using a protocol such as PPP or IP (step S311). Thereafter, the communication network information obtaining unit 107 measures information regarding communication circumstances such as throughput using a predetermined command with respect to the reference server 40, and records an obtained result (step S313). Thereafter, the communication network information obtaining unit 107 ends the test process of a mobile communication network.

As above, the flow of the information processing method performed by the information processing apparatus 10 according to the embodiment has been described with reference to FIGS. 10 to 12.

Information Management Method

Figure 13:
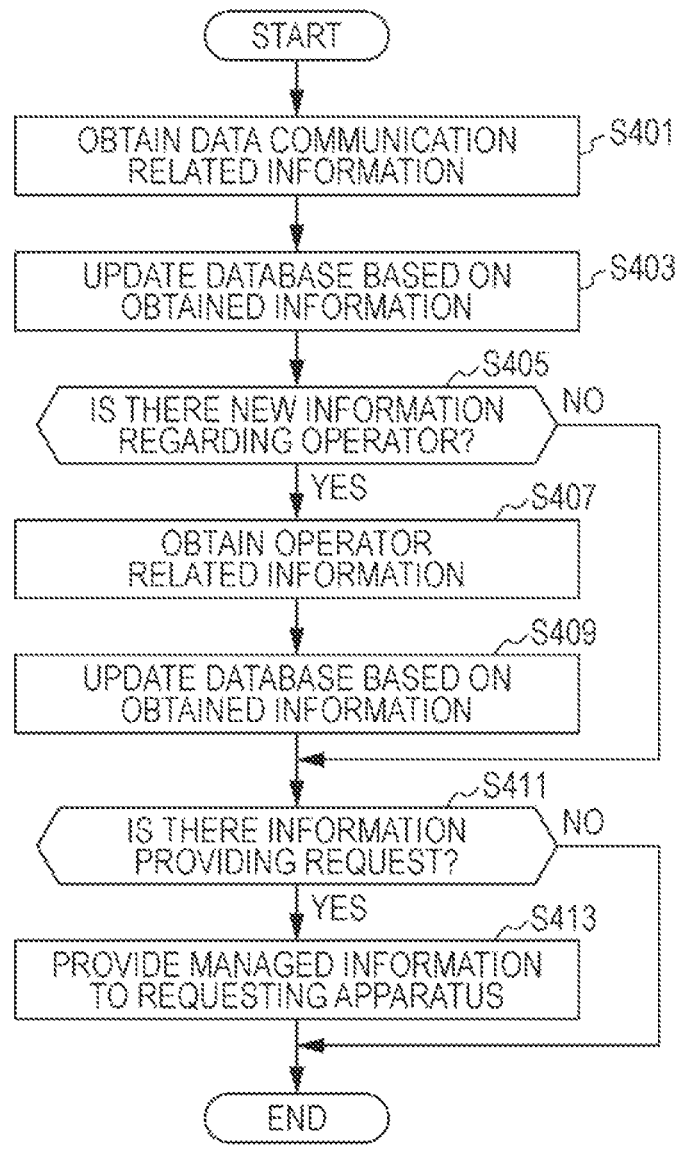
FIG. 13 is a flowchart illustrating an example of the flow of the information processing method according to the embodiment.

Next, a flow of an information management method performed by the information management server 20 according to the embodiment will be described briefly with reference to FIG. 13. FIG. 13 is a flowchart illustrating an example of the flow of the information management method according to the embodiment.

First, if obtaining data communication related information (step S401), the data communication related information obtaining unit 201 of the information management server 20 outputs the obtained data communication related information to the information management unit 203. If obtaining the data communication related information, the information management unit 203 updates the database based on the obtained information (step S403).

Next, the operator related information obtaining unit 205 refers to the database stored in the storage unit 211 or the like, and determines whether or not new information regarding an operator (information regarding a new operator or a new region) is present (step S405). If new information regarding an operator is not present, the information management server 20 performs the process in step S411 described later.

On the other hand, if new information regarding an operator is present, the operator related information obtaining unit 205 obtains operator related information using the information communication network 7 (step S407), and outputs the obtained information to the information management unit 203. Thereafter, the information management unit 203 updates the database based on the obtained operator related information (step S409).

In addition, the management information providing unit 207 determines whether or not there is a request for providing information from the information processing apparatus 10 or the user operation terminal (step S411). If there is no request for providing information, the information management server 20 waits for data communication related information to be received or waits for a request for providing information to be received. In addition, if there is a request for providing information, the management information providing unit 207 refers to the storage unit 211 or the like, and provides managed information to a device which has made the request (step S413). Thereafter, the information management server 20 waits for data communication related information to be received or waits for a request for providing information to be received.

As above, the information management method performed by the information management server 20 according to the embodiment has been described briefly with reference to FIG. 13.

Hardware Configuration

Figure 14:
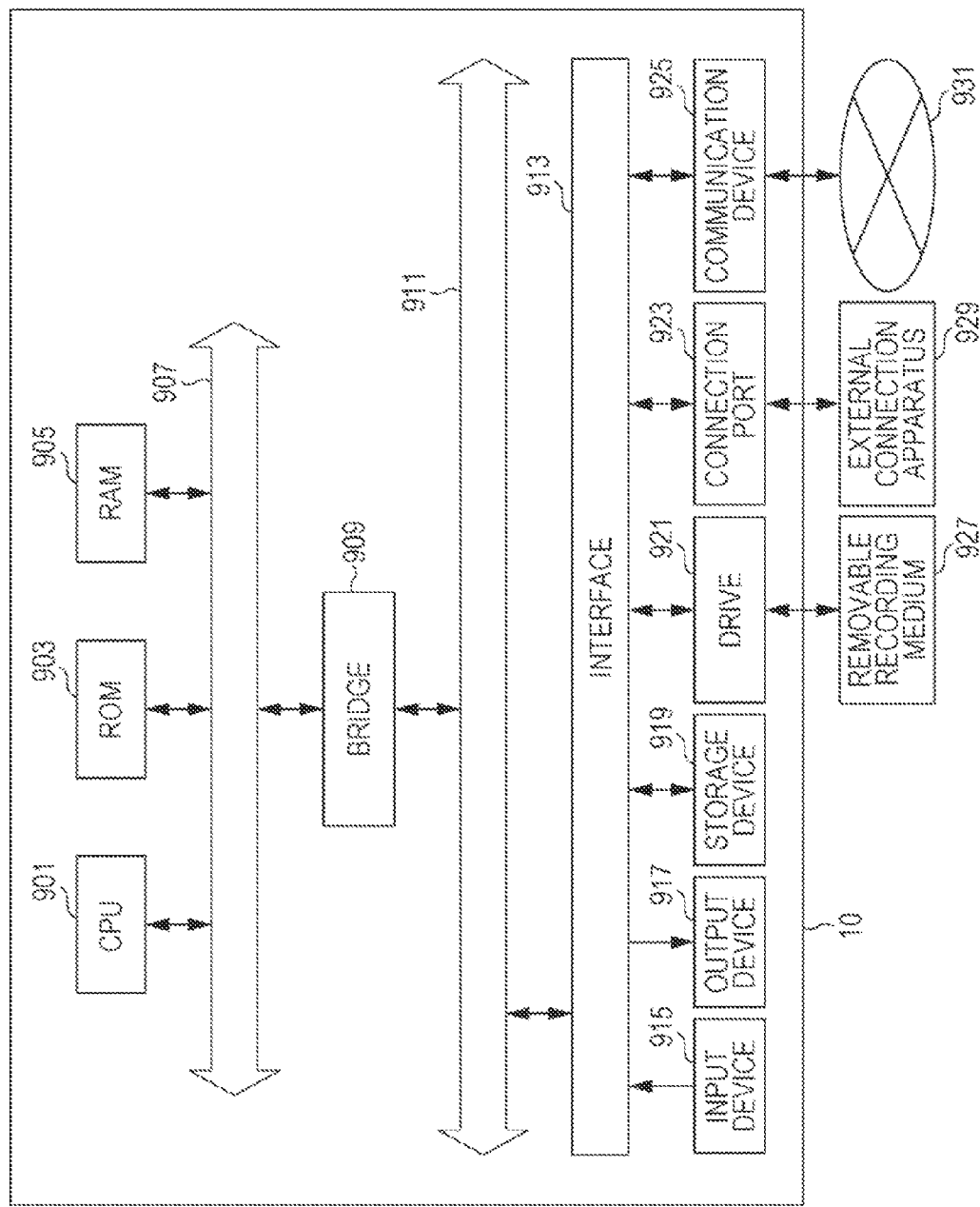
FIG. 14 is a block diagram illustrating a hardware configuration of the information processing apparatus according to an embodiment.

Next, a hardware configuration of the information processing apparatus 10 according to an embodiment will be described in detail with reference to FIG. 14. FIG. 14 is a block diagram illustrating a hardware configuration of the information processing apparatus 10 according to an embodiment.

The information processing apparatus 10 mainly includes a CPU 901, a ROM 903, and a RAM 905. In addition, the information processing apparatus 10 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls the whole operation of the information processing apparatus 10 or a portion thereof according to various kinds of programs recorded in the ROM 903, the RAM 905, the storage device 919, or a removable recording medium 927. The ROM 903 stores programs or operational parameters used by the CPU 901. The RAM 905 primarily stores programs used by the CPU 901, parameters which are appropriately varied in executing the programs, or the like. They are connected to each other via the host bus 907 formed by internal buses such as a CPU bus.

The host bus 907 is connected to the external bus 911, such as a PCI (Peripheral Component Interconnect/Interface) bus, via the bridge 909.

The input device 915 is an operation device which is operated by a user, such as, for example, a mouse, a keyboard, a touch panel, a button, a switch, and a lever. In addition, the input device 915 may be, for example, a remote control device (a so-called remote controller) using infrared rays or other electric waves, or may be an external connection device 929 such as a mobile phone or a PDA supporting the operation of the information processing apparatus 10. Further, the input device 915 is constituted by, for example, an input control circuit or the like, which generates an input signal based on information input by a user using the operation device and outputs the input signal to the CPU 901. A user of the information processing apparatus 10 can input various kinds of data to the information processing apparatus 10 or instruct the information processing apparatus 10 to perform processes by operating the input device 915.

The output device 917 includes devices which can notify a user of obtained information in a visible or audible manner. These devices include display devices such as CRT display devices, liquid crystal displays, plasma display panels, EL displays, and lamps, audio output devices such as speakers and headphones, printer devices, mobiles phones, facsimiles, and the like. The output device 917 outputs, for example, results obtained by various kinds of processes performed by the information processing apparatus 10. Specifically, the display device displays results obtained by various kinds of processes performed by the information processing apparatus 10, as a text or an image. On the other hand, the audio output device converts an audio signal including reproduced audio data, sound data, or the like into an analog signal so as to be output.

The storage device 919 is a device for storing data, which is formed as an example of a storage unit of the information processing apparatus 10. The storage device 919 includes, for example, a magnetic storage device such as an HDD (Hard Disk Drive), a semiconductor storage device, an optical storage device, a magneto-optical storage device, and the like. The storage device 919 stores programs or various kinds of data executed by the CPU 901, various kinds of data obtained from an external device, and the like.

The drive 921 is a reader and writer for a recording medium, and is built-into or installed externally to the information processing apparatus 10. The drive 921 reads information recorded on the removable recording medium 927 such as a magnetic disk, an optical disc, a magneto-optical disc, or a semiconductor memory, which is installed, and outputs the read information to the RAM 905. In addition, the drive 921 writes information on the removable recording medium 927 such as a magnetic disk, an optical disc, a magneto-optical disc, or a semiconductor memory, which is installed. The removable recording medium 927 includes, for example, a DVD medium, an HD-DVD medium, a Blu-ray medium, and the like. In addition, the removable recording medium 927 may be a Compact Flash (CF, registered trademark), a flash memory, an SD (Secure Digital) memory card, or the like. Further, the removable recording medium 927 may be, for example, an IC (Integrated Circuit) card or an electronic apparatus with a non-contact IC chip mounted thereon.

The connection port 923 is used to directly connect a device to the information processing apparatus 10. An example of the connection port 923 includes a USB (Universal Serial Bus) port, an IEEE 1394 port, an SCSI (Small Computer System Interface) port, and the like. Other examples of the connection port 923 include an RS-232C port, an optical audio terminal, an HDMI (High-Definition Multimedia Interface) port, and the like. The external connection device 929 is connected to the connection port 923, and thereby the information processing apparatus 10 directly obtains various kinds of data from the external connection device 929 or provides various kinds of data to the external connection device 929.

The communication device 925 is, for example, a communication interface constituted by a communication device and the like for connection to a communication network 931. The communication device 925 may be, for example, a communication card or the like for a wired or wireless LAN (Local Area Network), Bluetooth (registered trademark), or a WUSB (Wireless USB). In addition, the communication device 925 may be a router for optical communication, a router for ADSL (Asymmetric Digital Subscriber Line), a modem for various kinds of communication, or the like. This communication device 925 can transmit and receive a signal to and from, for example, the Internet, mobile communication networks, or other communication devices, based on a predetermined protocol such as, for example, TCP/IP. In addition, the communication network 931 connected to the communication device 925 is formed by a network or the like connected in a wired or wireless manner, and may be, for example, the Internet, a mobile communication network, a home LAN, infrared communication, radio wave communication, satellite communication, or the like.

As above, an example of the hardware configuration capable of realizing the function of the information processing apparatus 10 according to this embodiment has been described. Each of the above-described constituent elements may be configured using general purpose members, or may be configured by hardware specialized to the function of each constituent element. Therefore, a hardware configuration to be used may be appropriately modified according to the technical level at the time of implementing the embodiment.

The information management server 20 according to the embodiment has the same hardware configuration and achieves the same effects as the information processing apparatus 10 according to the embodiment, and thus detailed description thereof will be omitted.

As described above, in the information processing apparatus according to the embodiment, it is possible to obtain information helpful to determine which mobile communication network is accessed at the time of data communication via one or a plurality of mobile communication networks including the time of international roaming, by correlation with positional information. In addition, the information is managed and is generated as a database by the information management server, and thereby the information can be shared by the respective information processing apparatuses. As a result, the information processing apparatus can easily select an optimal mobile communication network from the beginning in a case where the information processing apparatus is present for the first time at a location where the information is present in the database.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
one or more circuits operable to:
detect a presence position of the information processing apparatus;
obtain information regarding data communication in each of a plurality of mobile communication networks;
generate data communication related information regarding the data communication using each of the plurality of mobile communication networks at the presence position based on information regarding the presence position and the information regarding the data communication in a respective mobile communication network;
select an accessible mobile communication network from the plurality of mobile communication networks based on the generated data communication related information, wherein the generated data communication related information includes at least one of: information regarding an operator providing the accessible mobile communication network, information regarding a communication scheme in the accessible mobile communication network, information regarding whether to provide a packet service in the accessible mobile communication network, and information regarding an access point of the accessible mobile communication network; and
transmit the generated data communication related information correlated with the information regarding the presence position via the accessible mobile communication network.

2. The information processing apparatus according to claim 1, wherein the one or more circuits are operable to transmit the generated data communication related information to an external information management server via the accessible mobile communication network.

3. The information processing apparatus according to claim 1, wherein the one or more circuits are operable to control data communication performed via the accessible mobile communication network, wherein the one or more circuits are operable to select the accessible mobile communication network at a current position based on data communication related information for each of the plurality of mobile communication networks obtained from an information management server.

4. The information processing apparatus according to claim 1, wherein the one or more circuits are operable to establish connection to a server via the accessible mobile communication network, and measure at least one of throughput, packet loss, bit rate, blocked ports, response time, and response delay between the information processing apparatus and the server.

5. An information management server comprising:
one or more circuits operable to:
obtain data communication related information regarding data communication using an accessible mobile communication network at a presence position, wherein the data communication related information is received from an information processing apparatus via the accessible mobile communication network selected from a plurality of mobile communication networks based on the data communication related information for each of the plurality of mobile communication networks,
wherein the data communication related information is generated based on information indicating the presence position of the information processing apparatus and information regarding data communication in the accessible mobile communication network at the presence position,
wherein the information regarding the data communication in the accessible mobile communication network includes at least one of information regarding an operator providing the accessible mobile communication network, information regarding a communication scheme in the accessible mobile communication network, information regarding whether to provide a packet service in the accessible mobile communication network, and information regarding an access point of the accessible mobile communication network; and
manage a database which correlates the presence position of the information processing apparatus with information regarding the accessible mobile communication network based on the obtained data communication related information.

6. The information management server according to claim 5, wherein the one or more circuits are operable to correlate information in the database regarding a second operator with which the operator providing the accessible mobile communication network cooperates with regard to roaming.

7. The information management server according to claim 5, wherein the one or more circuits are operable to provide the managed database to an information processing apparatus which requests the database.

8. An information processing method comprising:
detecting a presence position of an information processing apparatus;
obtaining information regarding data communication in each of a plurality of mobile communication networks;

generating data communication related information regarding the data communication using each of the plurality of mobile communication networks at the presence position based on information regarding the presence position and the information regarding the data communication in a respective mobile communication network;

selecting an accessible mobile communication network from the plurality of mobile communication networks based on the generated data communication related information, wherein the generated data communication related information includes at least one of: information regarding an operator providing the accessible mobile communication network, information regarding a communication scheme in the accessible mobile communication network, information regarding whether to provide a packet service in the accessible mobile communication network, and information regarding an access point of the accessible mobile communication network; and transmitting the generated data communication related information correlated with the information regarding the presence position via the accessible mobile communication network.

9. The information processing method according to claim 8, further comprising controlling data communication performed via the accessible mobile communication network, and selecting the accessible mobile communication network at a current position based on the data communication related information for each of the plurality of mobile communication networks obtained from an information management server.

10. The information processing method according to claim 8, further comprising establishing connection to a server via the accessible mobile communication network, and measuring at least one of throughput, packet loss, bit rate, blocked ports, response time, and response delay between the information processing apparatus and the server.

11. An information management method comprising:
obtaining data communication related information regarding data communication using an accessible mobile communication network at a presence position, wherein the data communication related information is received from an information processing apparatus via the accessible mobile communication network selected from a plurality of mobile communication networks based on the data communication related information for each of the plurality of mobile communication networks,
wherein the data communication related information is generated based on information indicating the presence position of the information processing apparatus and information regarding data communication in the accessible mobile communication network at the presence position,
wherein the information regarding the data communication in the accessible mobile communication network includes at least one of information regarding an operator providing the accessible mobile communication network, information regarding a communication scheme in the accessible mobile communication network, information regarding whether to provide a packet service in the accessible mobile communication network, and information regarding an access point of the accessible mobile communication network; and
managing a database which correlates the presence position of the information processing apparatus with information regarding the accessible mobile communication network based on the obtained data communication related information.

12. A non-transitory computer-readable storage medium having stored thereon, a computer program having at least one code section for communication, the at least one code section being executable by a computer for causing the computer to perform steps comprising:
detecting a presence position of an information processing apparatus;
obtaining information regarding data communication in each of a plurality of mobile communication networks;
generating data communication related information regarding the data communication for each of the plurality of mobile communication networks at the presence position based on information regarding the presence position and information regarding the data communication in a respective mobile communication network;
selecting an accessible mobile communication network from the plurality of mobile communication networks based on the generated data communication related information, wherein the generated data communication related information includes at least one of: information regarding an operator providing the accessible mobile communication network, information regarding a communication scheme in the accessible mobile communication network, information regarding whether to provide a packet service in the accessible mobile communication network, and information regarding an access point of the accessible mobile communication network; and
transmitting the generated data communication related information correlated with the information regarding the presence position via the accessible mobile communication network.

13. A non-transitory computer-readable storage medium having stored thereon, a computer program having at least one code section for communication, the at least one code section being executable by a computer for causing the computer to perform steps comprising:
obtaining data communication related information regarding data communication using an accessible mobile communication network at a presence position, wherein the data communication related information is received from an information processing apparatus via the accessible mobile communication network selected from a plurality of mobile communication networks based on the data communication related information for each of the plurality of mobile communication networks,
wherein the data communication related information is generated based on information indicating the presence position of the information processing apparatus and information regarding data communication in the accessible mobile communication network at the presence position,
wherein the information regarding the data communication in the accessible mobile communication network includes at least one of information regarding an operator providing the accessible mobile communication network, information regarding a communication scheme in the accessible mobile communication network, information regarding whether to provide a packet service in the accessible mobile communication network, and information regarding an access point of the accessible mobile communication network; and managing a database which correlates the presence position of the information processing apparatus with information regarding the accessible mobile communication network based on the obtained data communication related information.

14. An information processing system comprising:
an information processing apparatus; and
an information management server, wherein the information processing apparatus comprises a first set of one or more circuits operable to:
  detect a presence position of the information processing apparatus;
  obtain information regarding data communication in an accessible mobile communication network; and
  generate data communication related information regarding the data communication using the mobile communication network at the presence position based on information regarding the presence position and the information regarding the data communication in the mobile communication network,
wherein the information processing apparatus transmits the generated data communication related information to an external information management server via the accessible mobile communication network, wherein the information management server comprises a second set of one or more circuits operable to:
  obtain the data communication related information from the information processing apparatus; and
  manage a database which correlates the presence position of the information processing apparatus with information regarding an available mobile communication network based on the obtained data communication related information.

* * * * *